United States Patent [19]
Weinstein et al.

[11] 3,901,764
[45] Aug. 26, 1975

[54] PROCESS FOR PRODUCING RIFAMYCIN SV

[75] Inventors: Marvin J. Weinstein; Gerald H. Wagman, both of East Brunswick; Mahesh G. Patel, Belleville; Joseph A. Marquez, Montclair, all of N.J.

[73] Assignee: Schering Corporation, Kenilworth, N.J.

[22] Filed: May 15, 1974

[21] Appl. No.: 469,972

[52] U.S. Cl. .................................................. 195/96
[51] Int. Cl.$^2$ ......................................... C12D 9/20
[58] Field of Search ........................... 195/96, 80 R

[56] References Cited
UNITED STATES PATENTS
3,597,324   8/1971   Lancini et al. .................... 195/80 R

*Primary Examiner*—Alvin E. Tanenholtz
*Attorney, Agent, or Firm*—Carver C. Joyner; Stephen B. Coan; Raymond A. McDonald

[57] ABSTRACT

A fermentation process for preparing rifamycin SV employing a heretofore unknown microorganism is described, said microorganism being classified as a member of the genus *Micromonospora* and being herein named, *Micromonospora ellipsospora* 71372.

5 Claims, No Drawings

PROCESS FOR PRODUCING RIFAMYCIN SV

This invention relates to a new process for preparing a known antibiotic. More particularly, this invention relates to a process for preparing rifamycin SV by fermenting strains of *Micromonospora ellipsospora* under controlled conditions.

BACKGROUND OF THE INVENTION

Rifamycin SV is a known antibiotic whose preparation via chemical means from substances produced by fermenting strains of *Streptomyces mediterranei* has been described. In a recent patent (U.S. Pat No. 3,597,324, issued Aug. 3, 1971) is described a method for producing the antibiotic via microbiological means using a mutant strain of *S. mediterranei*.

We have discovered that *Micromonospora ellipsospora* 71372 produces rifamycin SV when fermented under submerged aerobic conditions in the presence of assimilable sources of carbon and nitrogen.

The Microorganism

*Micromonospora ellipsospora* 71372 (sometimes herein designated as *M. ellipsospora*) was classified as a species of the genus Micromonospora on the basis of whole cell analysis. And on the basis of growth and physiological properties it was determined to be a new species. Whole cell analysis revealed that the microorganism contained meso-diaminopimelic acid (DAP), Xylose and arabinose as characteristic chemical components. The microorganism is also unique in that it is the only species of the genus Micromonospora known in the art which is reported to produce rifamycin SV.

Representative samples of *M. ellipsospora* 71372 have been deposited with the ARS Culture Collection Investigations Fermentation Laboratory, Northern Utilization Research and Development Division, Peoria, Illinois 61604 where it was assigned the ascension number NRRL 8021. A significant characteristic of the microorganism is its ability to elaborate the antibiotic, rifamycin SV. Thus, this invention relates to a process for producing rifamycin SV by *Micromonospora ellipsospora* 71372-NRRL 8021 or by mutants or variants thereof having the characteristics of NRRL 8021 as set forth in the tables below:

In describing the color formations the following system and references are employed: The color designation consists of two designates. The first is a color name taken from the "Descriptive Color Name Dictionary," by Taylor, Knoche and Granville, published by the Container Corporation of America, 1950 (U.S.A.), with a color chip number corresponding to the color name; said chip number taken from the "Color Harmony Manual," 4th edition, 1958, published by the Container Corporation of America, U.S.A. The second designate, consists of a color-name and number which refers to the synonym or near synonym found in the National Bureau of Standards, Circular 553, Nov. 1, 1955 (U.S.A.).

Table 1

Growth Characteristics on Various Media

| | Growth of colony (vigor) +++ + ± good fair poor | Surface texture and form... plicate, viscid, flat, furrowed, glabrous, powdery | Aerial mycelium present, absent, other | Surface color of colony, chip number and NBS equivalent | Soluble (diffusible) pigment by transmitted light | Physiological properties on particular substrate | Comments (culture name or number) File number |
|---|---|---|---|---|---|---|---|
| Czapek Sucrose Agar | +++ | plicate | absent | g2pn — dark brown; dark olive 108 | slight brownish tint | | |
| Glucose Asparagine Agar | + | flat, often furrowed or granular somewhat moist | absent | g4pg — dark luggage tan; strong brown 55 | none | | |
| Calcium Malate Agar | + | raised, granular | absent | g4pe — orange rust; deep orange 51 | none | | |
| Czapek Glucose Solution | + | floculent no surface growth | absent | g3ic — Lt. amber dark orange yellow 72 | none | | |
| Ordinary Agar (Water agar) | ± insufficient for characterization | | | | | | |
| Nutrient Agar | + to ± | flat | absent | g3ic — Lt. amber dark orange yellow 72 | none | | |
| Loeffler's Serum Medium | +++ | plicate | absent | g5pg — rust brown; strong brown 55 | reddish brown | substrate partially decomposed | |
| Calcium Citrate Agar | + | flat, sometimes furrowed | absent | g4pe — russet orange; strong orange 50 | none | | |
| Potato +CaCO₃ Medium | +++ | plicate | absent | g4ia Apricot; Strong Orange 50 to g4pi Oak | Light brown very light brown | | |
| −CaCO₃ | +++ | plicate | absent | Brown; Strong Brown 55 g4pe Orange Rust; Deep Orange 51 | | | |
| Peptone Glucose Medium | ± insufficient for description | | | | | | |
| Egg Agar Medium | + | plicate | absent | g4le Turf tan; Light brown 57 | none | substrate not decomposed | |
| Gelatin Medium | ± | flat | absent | g4pe Orange Rust; Deep Orange 51 | none | | |
| Starch Agar | + | flat | absent | g5pi Copper Brown; Strong | faint brown | | |

Table I-continued

Growth Characteristics on Various Media

| | Growth of colony (vigor) +++ good, + fair, ± poor | Surface texture and form: plicate, viscid, flat, furrowed, glabrous, powdery, other | Aerial mycelium present, absent, other | Surface color of colony, chip number and NBS equivalent | Soluble (diffusible) pigment by transmitted light | Physiological properties on particular substrate | Comments (culture name or number) File number |
|---|---|---|---|---|---|---|---|
| Medium | | | | Brown 55 g4pl Oak Brown; | | | |
| Tyrosine Agar | ± | flat | absent | Strong Brown 55 to Black | faint reddish brown | | |
| Litmus Milk | | | | | | peptonized acid reaction | |
| Cellulose Medium | + | flat | absent | g5pe terra cotta; strong brown 55 to black | faint yellow | Cellulose decomposed | |
| Bennett's Agar | +++ | raised, plicate to viscid | absent | g2pn dark brown; dark olive 108 | very slight brownish color around some colonies | | |
| Emerson's Agar | + | flat | absent | g5pe terra cotta; strong brown 55 | none | | |
| Tomato Paste Oatmeal Agar | +++ | flat, furrowed | absent | g2pn dark brown; dark olive 108 | none | | |
| Glucose Yeast Extract Agar | +++ | plicate to granular | absent | g5pe terra cotta; strong brown 55 | slight amber pigment surrounding colonies | sweetish odor | |
| NZA Glucose Agar | +++ | plicate | absent | g5pe terra cotta; strong brown 55 | none | | |

Table II

Morphology of Reproductive Structures and Mycelium

| | |
|---|---|
| Branching of hyphae bearing spores (sporophore): simple, axial (verticillate), other | No aerial mycelium simple |
| Shape of hyphae bearing spores: linear (straight), curved (flexuous), looped (open spirals), spiral (closed spirals), other. | No aerial mycelium straight |
| Number of spores in chain: unispored, bispored, trispored, decaspored, multispored, other. | Spores not in chains. produced singly, no aerial mycelium |
| Electron microscope picture of spore or mycelial surface: smooth, rough, other. Spore shape and size. | Spore surface slightly warty, spores elliptical to irregular 0.6 × 1.2 μm average |
| Flagellated spores: present or absent; if present description of number of flagella and attachment of flagella. | Absent |
| Sporangia: present, absent; description if present. | Absent |
| Position of spores of sporangia: aerial mycelium, surface mycelium, substrate mycelium. | Spores on surface mycelium, sometimes on substrate mycelium |
| Adherence of aerial mycelium (synnemata): present or absent. | Not observed |
| Tendency of mycelium to fragment: 1. Only in older culture, if at all. 2. During sporulation mycelium fragments or lyses. 3. Mycelium readily fragments (nocardialike). | 1. Only in older cultures if at all |
| Sclerotia: present, absent, dimensions. | Absent |

Table III

Sodium Chloride Tolerance

| Control 0% | 1.5% | 3.0% | 4.0% | 5.0% | 7.0% | 10.0% |
|---|---|---|---|---|---|---|
| +++ good | ++ fair | + poor | ± no growth | ± | ± | ± |

Table IV

Carbohydrate Utilization

| | Good +++ | Fair ++ | Poor + | | Good +++ | Fair ++ | Poor + |
|---|---|---|---|---|---|---|---|
| L(+) arabinose | +++ | | | D(+) mannose | ++ | | |
| D(−) arabinose | | ± | | α D(+) melibiose | | | ± |
| dulcitol | | | + | D(+) | | | + |

Table IV-continued

| Carbohydrate Utilization | | | |
|---|---|---|---|
| D-D-galactose | +++ | melezitose D(+) raffinose | ± |
| D(+) glucose (dextrose) Positive Control | ++ | L(+) rhamnose | ± |
| glycerol | ± | D(−) ribose | + |
| i-inositol | ± | salicin | ± |
| β-lactose | ++ | sucrose | ++ |
| D(−) levulose (fructose) | ++ | D(+) xylose | ++ |
| D(+) mannitol | ± | Negative Control No Carbohydrate | ± |

Cell Wall analysis (diagnostic chemical constituents):
Type II - micromonospora type meso DAP + Arabinose + Xylose Table V

| Physiological Properties Growth Response | Maximal | Minimal | Optimal |
|---|---|---|---|
| pH | | | 6.5-7.5 |
| Temperature | 40°C | | 28°C |
| Oxygen requirements: aerobic, microaerophilic, anaerobic. | | | |
| Hydrolysis reactions | Good | Fair + | Poor |
| Gelatin (liquefaction) | | | |
| Starch | +++ | | |
| Milk (peptonization) | +++ | | |
| Cellulose (decomposition) | +++ | | |
| Tyrosine (dissolving of crystals) | | | ± |
| (melanin formation) | | | ± |
| Miscellaneous Chemical Reactions | Positive | Variable V | Negative |
| Nitrate Reduction | | | |
| Hydrogen sulfide production | | | ± |

The Fermentation

A sample of *M. ellipsospora* 71372 from an agar slant is used to inoculate a 300 ml flask containing 100 ml of a suitable medium, such as the one set forth below. The flask is incubated for from about 40 to about 72 hours at from about 25° to about 38°C, preferably about 35°C. The incubation is performed with continuous agitation at from about 250 to about 300 rpm. The inoculum is then frozen and maintained in a frozen state until ready for use, a 5% v/v inoculum being usually employed. In general, the fermentation involves one or more germination stages and one production stage. Germination is advantageously conducted at about 28°C commencing at about pH 7.5 and continuing for about 72 hours with agitation. A 5% inoculum is used to inoculate a second germination stage or to inoculate the production stage. Peak antibiotic production is usually attained in from about 96 to 120 hours at from about 25° to about 38°C, preferably about 28°C with agitation and aeration. Peak antibiotic production is determined by disc dilution test against *Staphylococcus aureus* ATCC 6538P. Typical germination and production media are as set forth in the specific examples.

Antibiotic Isolation

When peak antibiotic production is attained, the antibiotic is harvested by methods generally used in the art. Extraction of the fermentation medium with a non-water miscible polar organic solvent may advantageously be employed, ethyl acetate being the preferred solvent. By evaporating the extracts to a residue in vacuo, dissolving the residue in acetone and precipitating with ethyl ether an orange-yellow solid is obtained. Chromatographic comparison of the product with rifamycins O, B, S and SV using Whatman No. 1 paper and a solvent system composed of n-amyl alcohol:n-butanol (9:1) saturated with pH 8.6 phosphate buffer is as set forth in Table VI below.

By the above-described chromatographic system, rifamycin SV and rifamycin S are indistinguishable. However, by subjecting the product to oxidation, followed by thin layer chromatography and bioautography, it can be unequivocally determined that the product of the fermentation is in fact rifamycin SV. TABLE VI Rf as shown by bioautography against S. aureus ATCC 6538P.

| Fermentation Product | Rifamycin | | | |
|---|---|---|---|---|
| | B | O | S | SV |
| 0.87 | 0.40 | 0.40 | 0.87 | 0.87 |

EXAMPLE 1

Fermentation of Micromonospora Ellipsospora 71372

A. Germination Stage

Transfer under aseptic conditions 5 ml. of frozen whole broth of M. ellipsospora 71372 to a group of 300 ml. shake flasks containing 70 ml. of sterile medium having the following composition:

| | |
|---|---|
| Starch | 24 g. |
| Yeast extract | 5 g. |
| Dextrose | 1 g. |
| Beef extract | 3 g. |
| Tryptose | 5 g. |
| Calcium carbonate | 2 g. |
| Tap water | 1 liter |

The pH is adjusted to 7.5 with sodium hydroxide prior to sterilization.

Incubate the flasks and their contents for 2-3 days at about 35°C on rotary shakers (250-300 rpm, 2 inches stroke) and obtain thereby inocula having luxuriant growth.

B. Fermentation Stage

Transfer under aseptic conditions 500 ml of inoculum prepared as described in step A to 14 liter fermentors containing 10 liters of sterile medium A or medium B having the following compositions:

Production Media

| Medium A | | Medium B | |
|---|---|---|---|
| Trypticase say broth[1] | 300 g. | Sucrose | 250 g. |
| Soluble starch | 200 g. | N-Z Amine[2] | 50 g. |
| Tap water to | 10 l. | Yeast extract | 50 g. |
| | | Calcium carbonate | 20 g. |
| | | Tap water to | 10 l. |

[1]Baltimore Biological Labs
[2]Difco Laboratories

The pH is adjusted to 7.5 with sodium hydroxide prior to sterilization.

Conduct the fermentation at about 28°C, pH 6.8–7.3, with stirring at about 350 rpm, aeration at about 3.5 liters per minute for about 90 hours then commence sampling the fermentation. Submit the samples to disc dilution tests against *Staphylococcs aureus* 6535P to determine when peak antibiotic production is attained then isolate the antibiotic promptly.

EXAMPLE 2

Isolation of Rifamycin SV

Extract the whole broth from Example 1 repeatedly with 20 liter volumes of ethyl acetate until antibiotic is completely removed (i.e. a 100 fold concentrate of extract shows no u.v. absorption at 223 m$\mu$, 314 m$\mu$ or 445 m$\mu$). Combine the extracts and concentrate in vacuo to a residue, dissolve the residue in acetone and precipitate by pouring into 10 volumes of ethyl ether with stirring. Remove the orange-yellow precipitate by filtration and dry at 40°C in vacuo.
Yield - 0.53 g Chromatography of the precipitate on thin layer silica gel plates using a solvent system consisting of chloroform: methanol (9:1) followed by bioautography against *Staphylococcus aureus* ATCC 6538P indicates the presence of one biologically active compound which remains at the origin of the plate (i.e. $R_f = 0.00$). Authentic rifamycin SV has the same $R_f$.

EXAMPLE 3

Conversion of Rifamycin SV to Rifamycin S

Dissolve the precipitate obtained in Example 2 (0.5 g) in acetone with stirring and add a solution of potassium ferricyanide (3 equivalents). Stir the resulting mixture for 1 hour at room temperature, then add 5 volumes of water. Extract the rifamycin S with ethyl acetate, concentrate the extract to a residue and obtain thereby a red solid which on the above-described solvent system has an $R_f$ of 0.73. The product is indistinguishable from rifamycin S by physicochemical and biological evaluation.

The I.R. spectrum of the rifamycin S produced in Example 3 shows the following absorption bands:

| Wavelength - microns | |
|---|---|
| 2.95 (m.brd.) | 8.63 (m.brd.) |
| 3.40–3.50 (Nujol) | 8.95 (w) |
| 3.75 (w.brd.) | 9.20 (w) |
| 5.84 (sh.) | 9.45 (m.brd.) |
| 6.05 (s.brd.) | 10.27 (m.brd.) |
| 6.27 (w) | 10.57 (w) |
| 6.45 (sh.) | 10.95 (w) |
| 6.52 )s.brd.) | 11.18 (w) |
| 6.83 (Nujol) | 12.43 (w) |
| 7.25 (Mujol) | 12.75 (w) |
| 7.93 (s) | 13.15 (w) |
| 8.07 (vs.brd.) | 13.88 (Nujol) |

Notations: vs-very strong; s-strong; m-medium; w-weak; brd-broad; sh-shoulder

We claim:

1. A process for preparing rifamycin SV which comprises cultivating *Micromonospora eillipsospora* 71372, having the identifying characteristics of NRRL 8021, and the rifamycin SV producing mutants and variants thereof, in an aqueous nutrient medium under aerobic conditions until substantial antibiotic activity is imparted to the medium and isolating rifamycin SV from said medium.

2. A process according to claim 1 wherein the nutrient medium contains an assimilable source of carbon and nitrogen.

3. A process of claim 1 wherein *Micromonospora ellipsospora* 71372 NRRL 8021 is cultivated.

4. A process according to claim 2 wherein *Micromonospora ellipsospora* 71372 is cultivated at a temperature from about 25°C to about 38°C for from about 96 to about 120 hours and at a pH of from about 6.5 to about 7.5.

5. A process according to claim 1 wherein rifamycin SV is extracted from the medium with a water immiscible polar organic solvent and subsequently isolated therefrom.

* * * * *